(12) United States Patent
Tyler et al.

(10) Patent No.: US 8,442,297 B2
(45) Date of Patent: May 14, 2013

(54) METHODS OF EVALUATING THE QUALITY OF TWO-DIMENSIONAL MATRIX DOT-PEENED MARKS ON OBJECTS AND MARK VERIFICATION SYSTEMS

(75) Inventors: Roger K. Tyler, Norman, OK (US); Ronald D. Fowler, Yukon, OK (US)

(73) Assignee: Arinc Incorporated, Annapolis, MD (US)

( * ) Notice: Subject to any disclaimer, the term of this patent is extended or adjusted under 35 U.S.C. 154(b) by 594 days.

(21) Appl. No.: 12/710,750

(22) Filed: Feb. 23, 2010

(65) Prior Publication Data

US 2011/0206269 A1  Aug. 25, 2011

(51) Int. Cl.
*G06K 9/00* (2006.01)
(52) U.S. Cl.
USPC ........... 382/141; 382/140; 382/142; 382/143; 382/152; 382/154; 382/285
(58) Field of Classification Search .................. 382/100, 382/140–143, 152, 154, 285
See application file for complete search history.

(56) References Cited

U.S. PATENT DOCUMENTS

| | | | | |
|---|---|---|---|---|
| 5,671,056 A * | 9/1997 | Sato | ............................. | 356/602 |
| 6,244,764 B1 * | 6/2001 | Lei et al. | ....................... | 400/103 |
| 6,423,935 B1 * | 7/2002 | Hackel et al. | ............. | 219/121.85 |
| 6,793,140 B2 * | 9/2004 | Mazumder | ..................... | 235/487 |
| 6,850,592 B2 * | 2/2005 | Schramm et al. | ............... | 378/45 |
| 7,412,106 B1 * | 8/2008 | Nadabar et al. | ............... | 382/254 |
| 7,551,770 B2 * | 6/2009 | Harman | ........................ | 382/154 |
| 7,852,195 B2 * | 12/2010 | Costa et al. | ..................... | 340/5.8 |
| 8,224,064 B1 * | 7/2012 | Hassebrook et al. | ......... | 382/154 |
| 2005/0135670 A1 * | 6/2005 | Vaidyanathan | ............... | 382/154 |
| 2006/0118633 A1 * | 6/2006 | He et al. | .................... | 235/462.08 |
| 2006/0138234 A1 * | 6/2006 | Joseph et al. | .................. | 235/454 |
| 2006/0144945 A1 * | 7/2006 | He et al. | ......................... | 235/455 |
| 2007/0186417 A1 * | 8/2007 | Smyth | .............................. | 29/894 |
| 2007/0217672 A1 * | 9/2007 | Shannon et al. | .............. | 382/152 |
| 2008/0310757 A1 * | 12/2008 | Wolberg et al. | ............... | 382/285 |

OTHER PUBLICATIONS

Direct part mark quality guideline, AIM global document, AIM DPM-1-2006, 2006, pp. 1-16.*
Vision systems design, http://www.vision-systems.com/articles/2008/04/uid-verifier-lights-data-matrix-codes.html, Apr. 1, 2008, pp. 1-5.*

* cited by examiner

*Primary Examiner* — Jayesh A Patel
(74) *Attorney, Agent, or Firm* — Ronald E. Prass, Jr.; Prass LLP

(57) ABSTRACT

Methods and mark verification systems for evaluating the quality of a two-dimensional matrix dot peen mark on an object are provided. An exemplary embodiment of the methods includes scanning a two-dimensional matrix dot peen mark disposed on a surface of an object with a laser displacement sensor to generate three-dimensional scanned data for the mark, the mark including a plurality of dots disposed in a plurality of rows and columns on the surface; and determining whether the mark passes a verification test based on the scanned data.

17 Claims, 3 Drawing Sheets

METHODS OF EVALUATING THE QUALITY OF TWO-DIMENSIONAL MATRIX DOT-PEENED MARKS ON OBJECTS AND MARK VERIFICATION SYSTEMS

BACKGROUND

Objects can be marked by forming indentations, or "dots," by dot-peening in selected surfaces of the objects. This technique is referred to as direct part marking (DPM). The dots are formed in surfaces of objects in unique two-dimensional matrix patterns to provide a unique identifier of the objects.

The dot matrices formed on objects are read and also subjected to verification. Verification is performed to assure the quality of the mark.

It would be desirable to provide methods of evaluating the quality of two-dimensional matrix dot-peened marks on objects and mark verification systems that can provide more reliable verifications of marks.

SUMMARY

Methods of evaluating the quality of a two-dimensional matrix dot peen mark on an object and mark verification systems for evaluating the quality of a two-dimensional matrix dot peen mark on an object are provided. An exemplary embodiment of the methods comprises scanning a two-dimensional matrix dot peen mark disposed on a surface of an object with a laser displacement sensor to generate three-dimensional scanned data for the mark, the mark including a plurality of dots disposed in a plurality of rows and columns on the surface; and determining whether the mark passes a verification test based on the scanned data.

Another exemplary embodiment of the methods of evaluating the quality of a two-dimensional matrix dot peen mark on an object comprises producing a digital image of a two-dimensional matrix dot peen mark disposed on a surface of an object with a camera, the mark including a plurality of dots disposed in a plurality of rows and columns on the surface; determining whether the mark passes a verification test using the digital image of the mark, when the mark passes the verification test using the digital image of the mark, the mark is determined to be an acceptable mark; and wherein, when the mark fails the verification test using the digital image of the mark: scanning the mark with a laser displacement sensor to generate three-dimensional scanned data for the mark; and determining whether the mark passes the verification test based on the scanned data, when the mark passes the verification test based on the scanned data, the mark is determined to be an acceptable mark.

An exemplary embodiment of the mark verification systems for evaluating the quality of a two-dimensional matrix dot peen mark on an object comprises a camera for imaging a two-dimensional matrix dot peen mark disposed on a surface of an object with a camera to produce a digital image of the mark and for determining whether the mark passes a verification test using the digital image of the mark, the mark including a plurality of dots disposed in a plurality of rows and columns on the surface; and a laser displacement sensor for scanning the mark on the surface of the object to generate three-dimensional scanned data for the mark. The scanned data is usable to determine whether the mark passes the verification test.

DRAWINGS

DETAILED DESCRIPTION

Objects can be marked directly by forming indentations, referred to as "dots," in one or more selected surfaces of the objects. This technique is referred to as direct part marking (DPM). The dots can be formed in surfaces of such objects in specific two-dimensional matrix patterns that provide unique identifying information for each object.

Figure 1:
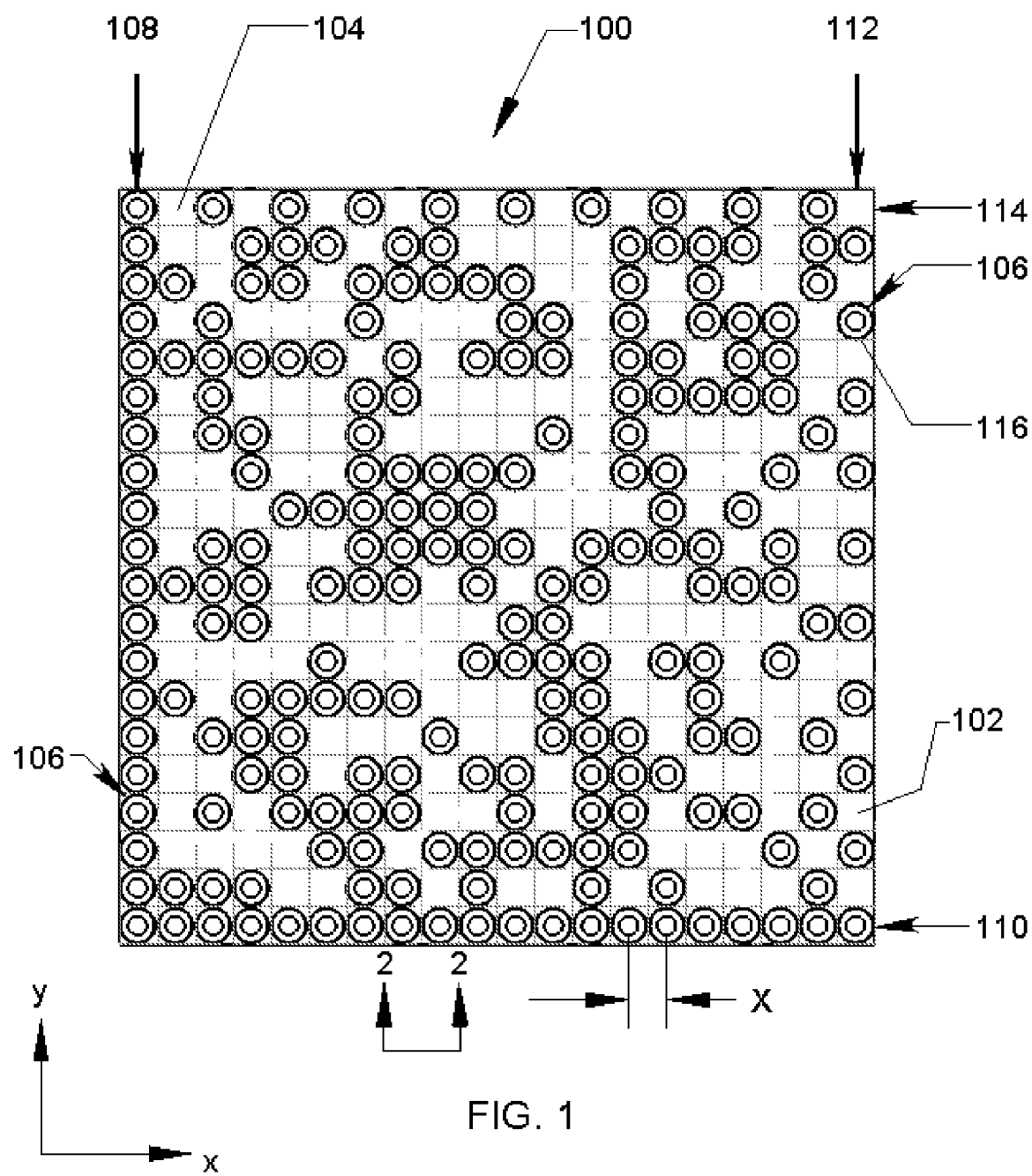
FIG. 1 depicts an exemplary two-dimensional matrix dot-peened mark on a surface of an object.

FIG. 1 depicts an exemplary dot matrix 100 formed in two-dimensions (i.e., x and y dimensions) in a surface 102. The dot matrix 100 is formed by dot-peening. The object can be a part, for example. The two-dimensional dot matrix 100 serves as a mark to provide unique information about the object to allow the object to be identified by reading of the mark. The marks may represent various unique types of information, such as part numbers, serial numbers, or the like. The individual dots of the matrix represent a 0 or 1 ("off" or "on"), for example (one bit of information). A group of eight dots can represent one byte of information, for example. Eight bits of information provides 256 combinations, allowing one byte to represent any alpha (upper and lower case), numeric, or other special character.

Each two-dimensional dot matrix (mark) contains the same information (part number, serial number, or the like) more than once to provide redundancy, which allows the mark to be damaged, but still be read. The surfaces of objects on which the dot matrices are formed can be flat or contoured. It is desirable that the surfaces be relatively smooth to provide higher contrast with the marks. The surfaces can be comprised of various materials in which suitable marks can be formed by dot-peening, including metals, polymers and composites, for example.

The illustrated dot matrix 100 is square-shaped and includes multiple dots 106 formed in an equal number of horizontal rows and vertical columns. The dots 106 are formed in the surface 102 within a matrix of cells 104. The cells 104 are defined by a finder pattern. The finder pattern is the outer-most rows and columns, which provides four sides to "frame" the mark. In the dot matrix 100, a single dot 106 is formed within some of the cells 104, while the remaining cells 104 do not contain a dot 106. As shown, the dot matrix 100 is defined by a first column 108 in which each cell 104 contains a dot 106, a first row 110 in which each cell 104 contains a dot 106 (with the first column 108 and first row 110 forming an "L"), a second column 112 in which alternating cells 104 contain a dot 106, and a second row 114 in which alternating cells 104 contain a dot 106.

The cells 104 of the dot matrix 100 can have dimensions of about 0.010 inch×0.010 inch, for example. The size of the mark can be selected based on characteristics of the object on which it is formed, such as the size of the object. An exemplary square-shaped dot matrix may include about 28 rows and 28 columns and have an overall size of about 0.28 inch (7.1 mm)×0.28 inch (7.1 mm). An exemplary rectangular dot matrix may include about 14 rows and 48 columns and have an overall size of about 0.14 inch (3.6 mm)×0.48 inch (12.2 mm).

Figure 2:
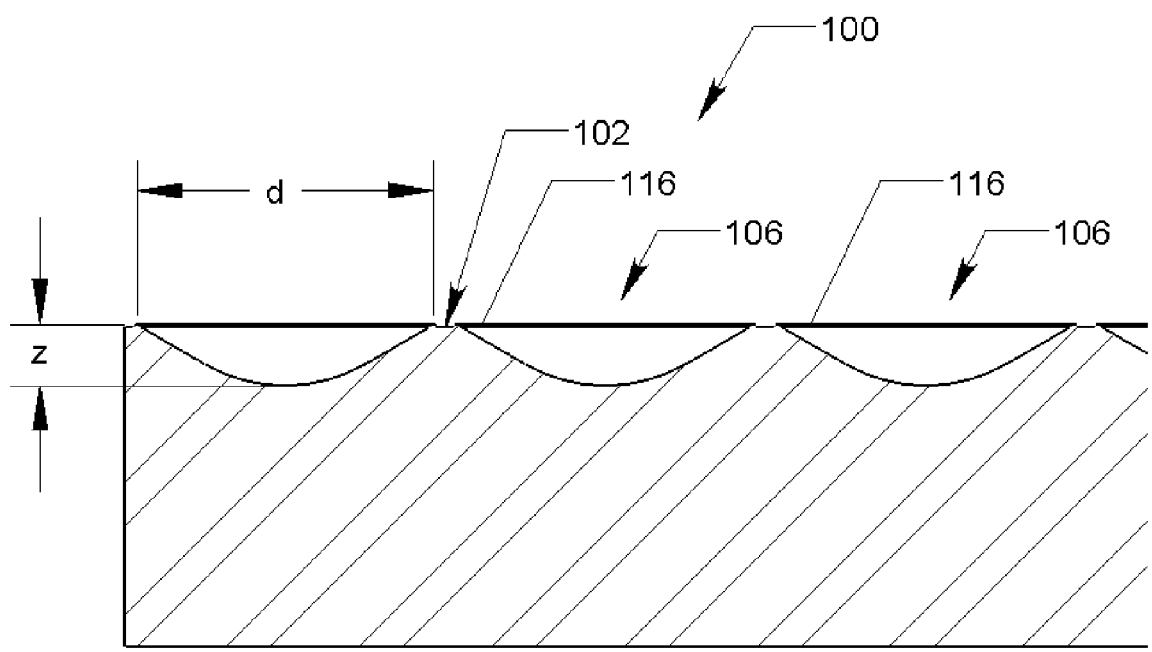
FIG. 2 is a cross-sectional view taken in the direction of line 2-2 of FIG. 1.

FIG. 2 depicts a cross-sectional view taken along a portion of the first row 110 of the dot matrix 100 showing several adjacent dots 106. As shown, the dots 106 have a semi-circular shape with a diameter, d, and a depth, z, relative to the surface 102. Adjacent dots 106 are substantially equally spaced along the first row 110 by a center-to-center distance, x (FIG. 1), which is also the nominal size of cells 104. The diameter d can range from about 60% to about 105% of the cell 104 size, for example. In an exemplary embodiment, the distance x can be about 0.0075 inch (0.19 mm) to about 0.020 inch (0.51 mm), and the depth z can be about 0.0008 inch (0.020 mm) to about 0.0030 inch (0.075 mm). As shown, material forms a raised surface edge 116 around the perimeter of the dots 106 during the indentation process. The raised surface edge 116 can typically have a height, h, about the surface 102 of about 0.0004 inch (0.010 mm) to about 0.0006 inch (0.015 mm), for example.

The dots 106 can be formed in the surface 102 using any suitable dot-peening device that forms indentations having the desired shape, size and matrix pattern. Dot-peening involves driving a stylus into a surface of an object to form the dots. The stylus has a hard tip, which can be comprised of diamond or a carbide material, for example. The stylus is driven pneumatically or electro-mechanically into the surface. The stylus tip is monitored to avoid excessive wear of the stylus tip, which can degrade the quality of the dot matrix formed on the surface. It is desirable that the dots 106 of the dot matrix 100 have substantially identical shapes and sizes.

The dot matrices formed on objects, such as the dot matrix 100, are read and also verified. The dot matrices are read to identify the object. Verification is performed to determine whether the mark is an acceptable mark, i.e., a mark having acceptable quality. The mark can be assigned a rating depending on its quality.

It has been noted that marks produced in surfaces of objects by dot-peening techniques can have low contrast with the surfaces. The marks can also have unsatisfactory cell positions and cell sizes. The surfaces of objects can have roughness or reflectivity characteristics that cause difficulties when verifying the marks using a camera. If a surface has poor contrast with the mark, and/or the lighting method defined in the standard(s) to evaluate the mark provides inadequate lighting conditions, a verifier may not be able to capture a sufficient image of the mark. A common problem that occurs is that the camera images may appear more as gray on black than as black on white. When an image has poor quality due, e.g., to underexposure or overexposure, the metrics used to evaluate the mark quality will not provide useful information. The mark then can fail verification and be unusable. Consequently, the verification process may result in marks that are actually of acceptable quality being found to have a failing grade.

Methods of evaluating the quality of two-dimensional matrix dot-peened marks on objects that can provide more reliable verification are provided. Embodiments of the methods can provide digitally-enhanced, two-dimensional images of marks on objects. Mark verification systems for evaluating the quality of such marks on objects are also provided.

In embodiments, a mark formed on a surface of an object can be subjected to reading and quality verification using a camera image of the mark. In cases where the mark fails verification according to the standard(s) used for the verification (typically due to contrast and/or lighting problems), the mark surface is then scanned with a laser scanning device to obtain a digitally-enhanced, two-dimensional image of the mark. The digitally-enhanced image of the mark provides desirable contrast with the object surface, and can provide a black on white appearance, with the dots appearing black and the surface of the object surrounding the dots appearing white. The digitally-enhanced mark image can be verified (without re-verifying the actual mark) without the contrast and/or lighting problems encountered in verifying the digital camera image of the actual mark.

Figure 3:
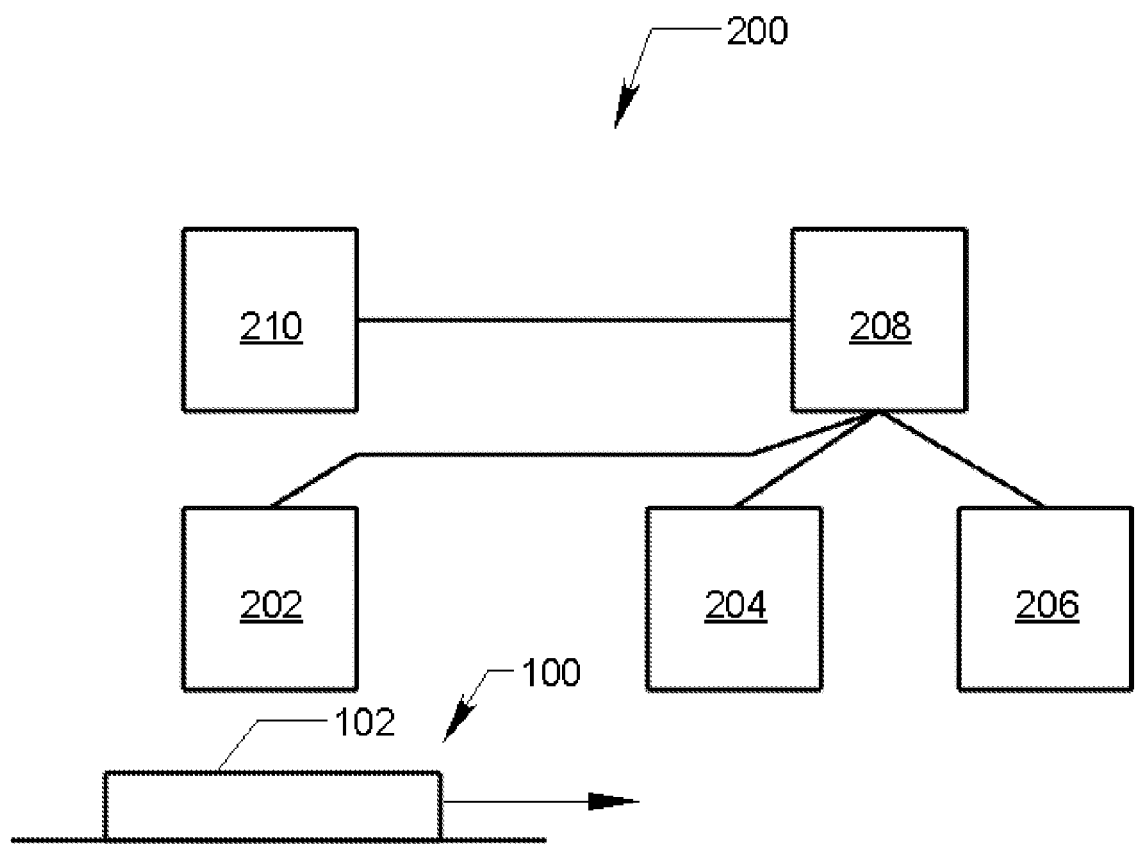
FIG. 3 depicts an exemplary embodiment of a mark verification system.

FIG. 3 depicts an exemplary mark verification system 200 that can be used to verify the quality of marks on objects. The mark verification system 200 includes an optional mark reading device 202 that is operable to read marks to determine or confirm the identity of objects. An object 100 having a surface 102 on which a mark is disposed is shown. The mark can be read by the mark reading device 202. The mark reading device 202 can include, e.g., any suitable dot-peen reader, bar code reader, or the like. The mark reading device 202 can be stationary or movable relative to the objects. As shown, the mark reading device 202 is connected to a computer 208.

The mark verification system 200 includes a camera 204 for verifying marks on objects. The camera 204 is connected to the computer 208. As shown, the object 100 can be moved with respect to the mark reading device 202 and the camera 204 for reading and imaging the mark. The mark verification system 200 can include, e.g., an automated transport for moving the object 100 with respect to the different devices. Suitable cameras that can be used in embodiments of the mark verification system 200 for mark verification include Cognex DataMan® verifiers, available from the Cognex Corporation of Natick, Massachusetts.

The camera 204 is operable to generate an internal digital image of the mark. The digital image is used internally in the camera 204 by verification software. The software uses mathematical algorithms to evaluate the digital image to determine whether the mark has each of the characteristics set forth in the standard(s). The two-dimensional camera image and mathematical evaluation provides the following metrics set forth in the verification standards ISO/IEC 15415 and AIM (Association for Automatic Identification and Mobility) DPM (Direct Part Mark) Quality Guideline DPM-1-2006, for assessing the overall quality of a mark and determining whether the mark is acceptable according to the verification standards: decodability, symbol contrast, cell modulation, axial non-uniformity, grid non-uniformity, unused error correction, fixed pattern damage and minimum reflectance. The final grade for the mark is the lowest of the individual metrics.

The mark verification system 200 further includes a laser scanning device 206. As shown, the laser scanning device 206 is connected to the computer 208. In embodiments, the laser scanning device 206 comprises a laser displacement sensor system. As shown, the object 100 can be moved relative to the laser scanning device 206, which can be stationary, to analyze marks on objects. In other embodiments, the laser scanning device 206 can be moved relative to the object 100, which can be stationary. Laser displacement sensor systems generate three-dimensional scanning data. In embodiments, the scanning data is used for verifying the mark when the mark fails a verification test using the digital image produced by the camera 204.

In embodiments, the three-dimensional scanning data acquired with the laser displacement sensor can be used to generate a three-dimensional solid surface model of the surface 102 of the object 100. The three-dimensional solid surface model can be used to produce a two-dimensional, overhead image of the mark. The overhead image can be a digital image. A hard-copy of the image can be produced by a printer. The mark verification device 200 includes an optional printer 210 connected to the computer 208. The overhead image of the mark can typically be taken in a direction substantially perpendicular to the surface of the object including the mark. The laser displacement sensor system can provide high-resolution capabilities. The scanning data generated by laser scanning produces digitally-enhanced, two-dimensional images of marks. The digitally-enhanced images of the marks can then be verified by using the camera 204 according to the standard(s) used for the initial verification of the mark. The laser scanning of the object can effectively remove lighting and/or contrast problems that can occur during verification of the mark, and that could have caused the mark to fail verification. Such problems could otherwise cause the actual mark to be found unusable when subjected to verification testing using a camera.

In embodiments, the three-dimensional scanned data can be used to determine, for all of the dots of a mark, a numerical value of the depth, z, below the surface of the object, and the height, h, of a raised surface edge. These numerical values, which are not related to the mark verification standards, can be used for evaluating the marks.

In other embodiments, the three-dimensional scanning data generated by laser scanning of a mark on a surface of an object with the laser scanning device 206 can be used to directly grade the mark, without also performing steps of producing a digitally-enhanced, two-dimensional image of the mark and using the camera 204 for verification of the two-dimensional image. In the embodiments, the three-dimensional scanning data generated by the laser scanning device 206 is transferred to the computer 208 (or to another suitable data processing device, such as an embedded processor, or the like), which can be configured to use the scanned data to directly grade the mark.

It will be appreciated that various ones of the above-disclosed, as well as other features and functions, or alternatives thereof, may be desirably combined into many other different systems or methods. Also, various presently unforeseen or unanticipated alternatives, modifications, variations or improvements therein may be subsequently made by those skilled in the art, which are also intended to be encompassed by the following claims.

What is claimed is:

1. A method of evaluating the quality of a two-dimensional matrix dot peen mark on an object, comprising:
   scanning a two-dimensional matrix dot peen mark disposed on a surface of an object with a laser displacement sensor to generate three-dimensional scanned data for the mark if a first two-dimensional image of the mark produced by scanning the mark fails a verification test, the mark including a plurality of dots disposed in a plurality of rows and columns on the surface, wherein the verification test is performed with a camera according to the standards ISO/IEC 15415 and AIM DPM Quality Guideline DPM-1-2006; and
   determining whether the mark passes the verification test based on the three-dimensional scanned data.

2. The method of claim 1, further comprising:
   producing a second, digitally enhanced two-dimensional image of the surface of the object including the mark using the three-dimensional scanned data; and
   analyzing the digitally enhanced two-dimensional image to determine whether the mark passes the verification test.

3. The method of claim 2, wherein the digitally enhanced two-dimensional image is analyzed using the camera.

4. The method of claim 2, wherein, in the enhanced two-dimensional image, the dots have a black appearance and the surface of the object surrounding the dots has a white appearance.

5. The method of claim 1, wherein the two-dimensional matrix is square-shaped or rectangular shaped.

6. The method of claim 1, further comprising determining, for all of the dots of the mark, (i) a depth below the surface of the object and (ii) a height of a raised surface edge, based on the scanned data.

7. The method of claim 1, wherein the surface of the object is comprised of a metal, polymer or composite material.

8. A method of evaluating the quality of a two-dimensional matrix dot peen mark on an object, comprising:
   producing a digital image of a two-dimensional matrix dot peen mark disposed on a surface of an object with a camera, the mark including a plurality of dots disposed in a plurality of rows and columns on the surface;
   determining whether the mark passes a verification test using the digital image of the mark, when the mark passes the verification test using the digital image of the mark, the mark is determined to be an acceptable mark; and p1 wherein, when the mark fails the verification test using the digital image of the mark:
   scanning the mark with a laser displacement sensor to generate three-dimensional scanned data for the mark; and
   determining whether the mark passes the verification test based on the scanned data, when the mark passes the verification test based on the scanned data, the mark is determined to be an acceptable mark, wherein the verification test is performed with the camera according to the standards ISO/IEC 15415 and AIM DPM Quality Guideline DPM-1-2006.

9. The method of claim 7, further comprising:
   producing a two-dimensional image of the surface of the object including the mark using the three-dimensional scanned data; and
   analyzing the two-dimensional image with the camera to determine whether the mark passes the verification test.

10. The method of claim 9, wherein the dots have a black appearance and the surface of the object surrounding the dots has a white appearance, in the two-dimensional image.

11. The method of claim 8, wherein the two-dimensional matrix is square-shaped or rectangular shaped.

12. The method of claim 8, further comprising determining, for all of the dots of the mark, (i) a depth below the surface of the object and (ii) a height of a raised surface edge, based on the scanned data.

13. The method of claim 8, wherein the surface of the object is comprised of a metal, polymer or composite material.

14. A mark verification system for evaluating the quality of a two-dimensional matrix dot peen mark on an object, comprising:
   a camera for imaging a two-dimensional matrix dot peen mark disposed on a surface of an object to produce a first digital image of the mark and for determining whether the mark passes a verification test using the digital image of the mark, the mark including a plurality of dots disposed in a plurality of rows and columns on the surface, wherein the camera is configured to perform the verification test according to the standards ISO/IEC 15415 and AIM DPM Quality Guideline DPM-1-2006; and
   a laser displacement sensor for scanning the mark on the surface of the object to generate three-dimensional scanned data when the mark fails the verification test using the first digital image, the three-dimensional scanned data being usable to determine whether the mark passes the verification test.

15. The mark verification system of claim 14, wherein the laser displacement sensor produces a second two-dimensional digital image of the surface of the object including the mark using the scanned data.

16. The mark verification system of claim 14, further comprising a computer connected to the camera and the laser displacement sensor, wherein the computer is configured to determine, for all of the dots of the mark, (i) a depth below the surface of the object and (ii) a height of a raised surface edge, and to produce a two-dimensional image of the surface of the object including the mark, using the scanned data.

17. The mark verification system of claim 14, further comprising a transport for moving the object with respect to the camera and the laser displacement sensor.

\* \* \* \* \*